Figure 1:
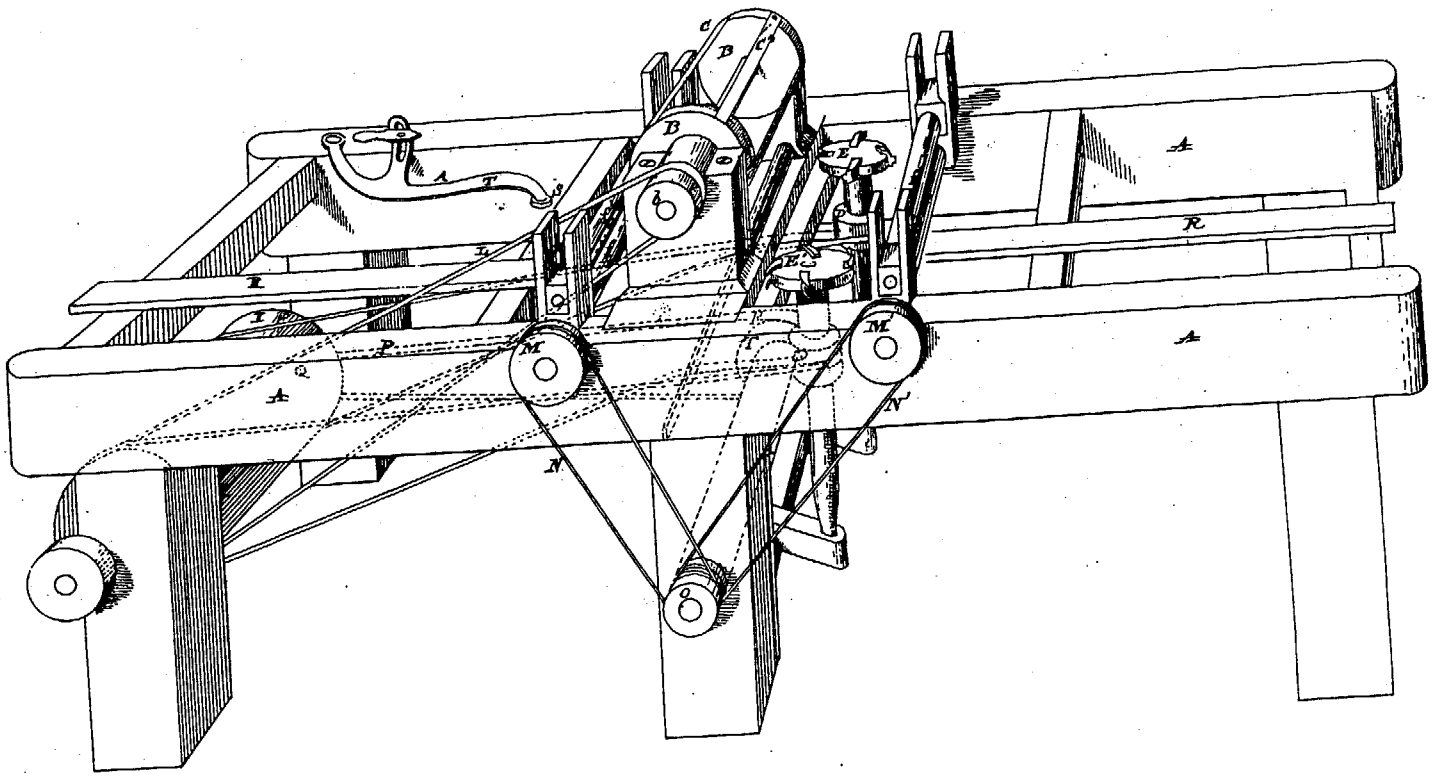

W. Woodworth,
2 SHEETS - SHEET 1.
Wood Planing Machine,
Rx №71,
Reissued July 8, 1845.
5315X RELATED DOC
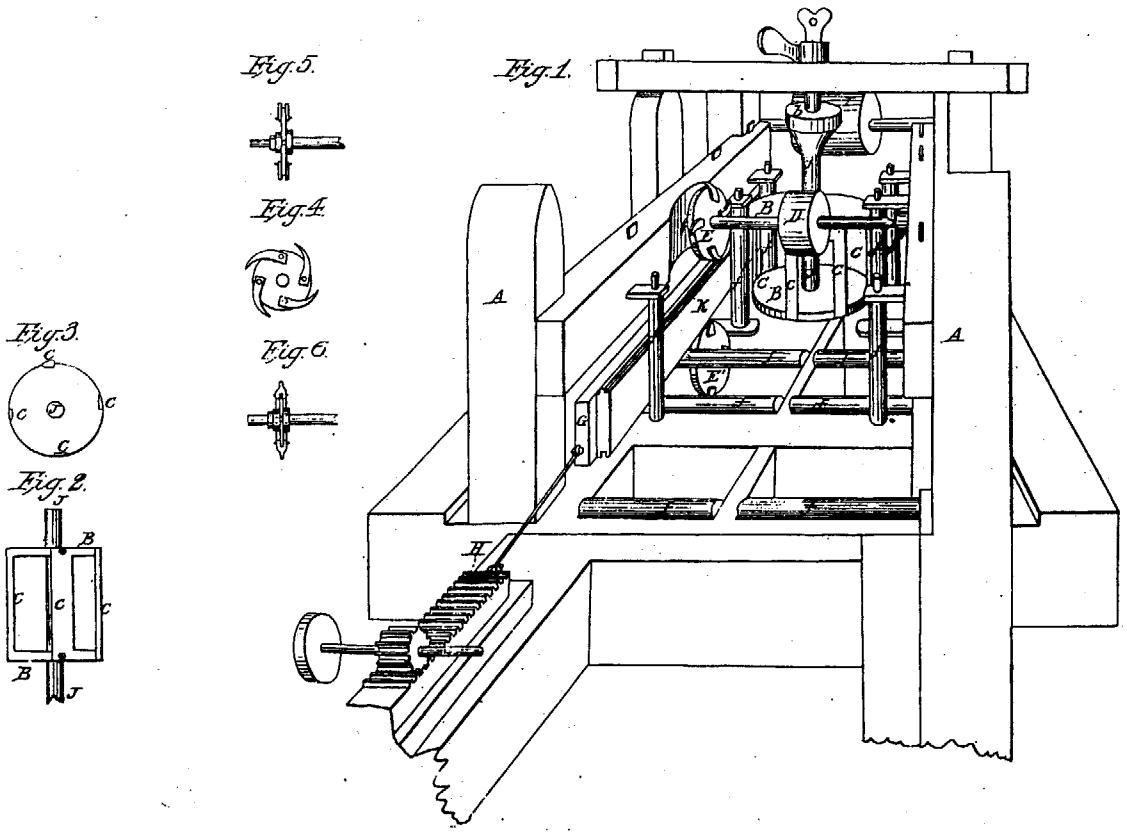

2 Sheets Sheet 2.

William Woodworth's Planing, Tongueing, & Grooving Machine

Rx 71

Reissue No. 71.

Reissued July 8 1845

5315 X RELATED DOC

UNITED STATES PATENT OFFICE.

WILLIAM W. WOODWORTH, OF HYDE PARK, NEW YORK, ADMINISTRATOR OF WILLIAM WOODWORTH.

RX 71

IMPROVEMENT IN MACHINES FOR PLANING, TONGUING, GROOVING, AND DRESSING BOARDS, &c.

Specification forming part of Letters Patent dated December 27, 1828; Reissue No. 71, dated July 8, 1845.

5315X RELATED DOC

*To all whom it may concern:*

Be it known that the following is a full, clear, and exact description of the method of Planing, Tonguing, and Grooving Plank or Boards invented by WILLIAM WOODWORTH, deceased, and for which Letters Patent of the United States were granted to him on the 27th day of December, in the year 1828, the said Letters Patent having been surrendered for the purpose of describing the same invention and pointing out in what it consists in more clear, full, and exact terms than was done in the original specification.

The plank or boards which are to be planed, tongued, and grooved are first to be reduced to a width by means of circular saws, by reducing-wheels, or by any other means. When circular saws are used for this purpose, two such saws should be placed upon the same shaft, on which they are to be capable of adjustment, so that they may be made to stand at any required distance apart. Under these the board or plank is to be forced forward and brought to the width required. This apparatus and process do not require to be further explained, they being well understood by mechanicians.

When what has been above denominated "reducing-wheels" are used, these are to consist of revolving cutter-wheels, which resemble in their construction and action the planing and reducing wheel to be presently described. These are to be made adjustable like the circular saws; but the latter are preferred for this purpose. The plank may be reduced to a width on a separate machine. When the plank or boards have been thus prepared, (on a separate machine,) they may be placed on or against a suitable carriage resting on a frame or platform, so as to be acted upon by a rotary cutting or planing and reducing wheel, which wheel may be made to revolve either horizontally or vertically, as may be preferred. The carriage which sustains the plank or board to be operated upon may be moved forward by means of a rack and pinion, by an endless chain or band, by geared friction-rollers, or by any of the devices well known to machinists for advancing a carriage or materials to be acted upon in machines for various purposes. The plank or board is to be moved on toward the cutting-edges of the cutters or knives on the planing-cylinder, so that its knives or cutters as they revolve may meet and cut the plank or board in a direction contrary to that in which it is made to advance. The edges of the cutters are in this method prevented from coming first into contact with its surface, and are made to cut upward from the reduced part of the plank toward said surface, by which means their edges are protected from injury by gritty matter, and the board or plank is more evenly and better planed than when moved in the reverse direction. After the board or plank passes the planing-cylinder, and as soon or fast as the planing-cylinder has done its work on any part of the board or plank, the edges are brought into contact with two revolving cutter-wheels, one of which is adapted to the cutting of the groove, and the other to the cutting of the two rabbets that form the tongue. When the axis of the planing and reducing wheel stands vertically, the grooving and tonguing wheels are placed one above the other, with the plank edgewise between them. When the axis of the planing-wheel stands horizontally, these wheels are on the same horizontal plane with each other, standing on perpendicular spindles.

The grooving-wheel consists of a circular plate fixed on an axis, and having one, two, three, four, or more cutters, which are to be screwed, bolted, or otherwise attached to it, the edges of which cutters project beyond the periphery of the plate to such distance as is required for the depth of the groove. Their thickness may be such as is necessary for its width. They are of course so situated as to cut the groove in the middle of the edge of the board, or as nearly so as may be required. The tonguing-wheel is similar in form to the grooving-wheel; but it has cutters on each of its sides, or otherwise so formed and arranged as to cut the two rabbets which are necessary to the formation of the tongue. The grooving and tonguing cutters at the same time and by the same operation reduce the board or plank to an exact width throughout. When the axis of the planing-wheel is placed vertically, the knives or cutters may be made to plane two planks at the same time, the planks being in this case moved in contrary directions, and so as to meet the edges of the revolving knives or cutters. When the machine is thus constructed, a second pair of grooving and tonguing wheels may be made to operate in the same way with those above described. A machine is to operate upon a single plank or board, and having the axis of the planing-wheel placed horizontally will, however, be more simple and less expensive than that intended to operate on two planks simultaneously.

In the accompanying drawings, Figure 1 is a perspective representation of the principal operating parts of the machine when arranged and combined for planing, tonguing, and grooving, and when so arranged as to be capable of planing two planks at the same time, the axis of the planing-wheel being placed vertically. A A is a stout substantial frame of the machine, which may be of wood or of iron, and may be varied in length, size, and strength according to the work to be done. B B are the heads of the planing-cylinder, and C C the knives or cutters, which extend from one to the other of said heads, to the peripheries of which they may be attached by means of screws. The knives C C, with the faces forming a planing-angle, may be placed in a line with the axis J of the cylinder, or they may stand obliquely thereto, as may be preferred; but in the latter case the edge should form the segment or portion of a helix. *b* represents a pulley near to the upper end of the axis J, and I a pulley or drum, which may be made to revolve by horse, steam, or other motive power, and from which a belt may extend around the pulley *b*, to drive the planing-cylinder and other parts of the machinery. G is the carriage, which is represented as being driven forward by means of a rack and pinion, H. Against this carriage the plank K which is to be planed, tongued, and grooved is placed, and is made to advance with it. It will be manifest, however, that the plank may be moved forward by other means—as, for example, by an endless chain or band passing around drums or chain-wheels, or by means of geared friction-wheels borne up against it. To cause the carriage and plank to move forward readily, there may be friction-rollers *f f f* placed horizontally and extending under them. The rollers *f′ f′ f′*, which stand vertically, are to be made to press against the plank and keep it close to the carriage, and thus prevent the action of the cutters from drawing the plank up from its bed in cutting from the planed surface upward. They may be borne against it by means of weights or springs in a manner well known to machinists. In a single horizontal machine the horizontal friction-rollers may be geared and the pressure-rollers placed above them, to feed the board with or without the carriage, a bed-plate being used directly under the planing-cylinder.

Fig. 2 is a separate view of the planing-cylinder with its knives or cutters, and Fig. 3 an end view of one of the heads. E E′ are the revolving cutter or tonguing and grooving wheels, and D D whirls upon their shafts, which may be driven by bands or otherwise, so as to cause said wheels to revolve in the proper direction.

Fig. 4 is a side view of one of these wheels. Fig. 5 is an edge view of the tonguing-wheel, and Fig. 6 an edge view of the grooving-wheel, the two latter being each shown with two cutters in place. The number of cutters on these wheels may be varied; but they are represented as furnished with four. The cutters may be fixed on the sides of circular plates, with their edges projecting beyond the periphery of said plate. The edges of the plank as its planed part passes the planing-cylinder are brought into contact with the above-described tonguing and grooving wheels, which are so placed upon their shafts as that the tongue and groove shall be left at the proper distance from the face of the plank, the latter being sustained against the planing-cylinder by means of the carriage or bed-plate, or otherwise, so that it cannot deviate, but must be reduced to a proper thickness and correctly tongued and grooved. In Fig. 1, above referred to, only one carriage and one pair of cutter-wheels are shown, it not being deemed necessary to represent those on the opposite side, they being similar in all respects.

Fig. 7 represents the same machine with the axis of the planing-cylinder placed horizontally, and intended to operate on one plank only at the same time. A A is the frame; B B, the heads of the planing-cylinder; C C, the knives or cutters attached to said heads. To meet the different thicknesses of the plank or boards, the bearings of the shaft of the cylinder may be made movable by screws or other means to adjust it to the work; or the carriage or bed-plate may be made so as to raise the board or plank up to the planing-cylinder. E and E′ are the revolving cutter or tonguing and grooving wheels, which are placed upon vertical shafts having upon them pulleys D D, around which pass belts or bands from the main drum I, to which a revolving motion may be given by any adequate motive power. From the drum I a belt, L, passes also around the pulley *b* on the shaft of the planing-cylinder and gives to it the requisite motion. There may in this machine be a horizontal carriage moved forward by a rack and pinion in a manner analogous to that represented in Fig. 1; but in the present instance the plank is supposed to be advanced by means of one or two pairs of friction or feed rollers. (Shown at *f f′*.) The uppermost, *f′ f′*, of the pairs of rollers may be held down by springs or weighted levers, which it has not been thought necessary to show in this drawing, as such are in common use. The lowermost of these rollers may be fluted or made rough on their surfaces, so as to cause friction on the under side of the plank. M M′ are pulleys on the axles of these lower rollers, which are embraced by bands N N′, which also pass around a pulley, O, on a shaft which crosses the frame A A and has a Rx 71 pulley, T, on it which is embraced by the belt P on a pulley, Q, on the shaft of the main drum I. These bands and pulleys serve to give motion to the feed-rollers, as will be readily understood by inspecting the drawings. R R are guide-strips used in place of the rollers, used for the same purpose, and also for bearing or friction rollers when the machine is vertical, to direct one edge of the plank, and against its opposite edge any pressure may be used equal to the weight of the board or plank when worked in a vertical position. One of the cutter-wheels should be made adjustable, to adapt it to stuff of different widths.

The planing-cylinder, and likewise the cutter or tonguing and grooving wheels, may be constructed in the manner represented in Figs. 2, 3, 4, 5, and 6, and hereinbefore fully described. One of the heads of the planing-wheel may be made movable, to accommodate its length to the width of the board, or plank to be planed.

The respective parts of this machine may be varied in size, as may also the velocity of the motion of the planing-cylinder and cutter-wheels; but the following has been found to answer well in practice: The planing-cylinder having four knives or cutters may be twelve inches in diameter and may make two thousand and upward revolutions in a minute.

In a machine constructed like that shown in Fig. 7 the main drum I may be two feet in diameter and may be driven with a speed of five hundred and upward revolutions in a minute. The pulleys on the planing-cylinder and on the cutter-wheels may be six inches in diameter. The plank should be moved forward at the rate of about one foot for every hundred revolutions of the cutter-wheel, and of course the diameters of the feed-rollers and of the pulleys by which they are turned must be so graduated as to produce this result. The size and speed of the above parts of this machine may be in some degree varied; but the above have been found to work well.

Having thus fully described the parts and combinations of parts and operation of the machine for planing, tonguing, and grooving boards or plank, and shown various modes in which the same may be constructed and made to operate without changing the principle or mode of operation of the machine, what is claimed therein as the invention of WILLIAM WOODWORTH, deceased, is—

1. The employment of rotating planes substantially such as herein described, in combination with rollers or any analogous device to prevent the board from being drawn up by the planes when cutting upward or from the reduced or planed to the unplaned surface, as described.

2. The combination of the rotating planes with the cutter-wheels for tonguing and grooving, for the purpose of planing, tonguing, and grooving boards, &c., at one operation, as described.

3. The combination of the tonguing and grooving cutter-wheels for tonguing and grooving boards, &c., at one operation, as described.

4. The combination of either the tonguing or the grooving cutter-wheel for tonguing or grooving boards, &c., with the pressure-rollers, as described, the effect of the pressure-rollers in these operations being such as to keep the board, &c., steady and prevent the cutters from drawing the board toward the center of the cutter-wheels while it is moved through by machinery. In the planing operation the tendency of the plane is to lift the board directly up against the rollers; but in the tonguing and grooving the tendency is to overcome the friction occasioned by the pressure of the rollers.

WILLIAM W. WOODWORTH,
*Administrator of William Woodworth, deceased.*

Witnesses:

JAMES MILLHOLLAND,
CHS. M. KELLER.